Jan. 4, 1966 W. T. ALDERSON ETAL 3,226,948
DEHUMIDIFYING APPARATUS
Filed Oct. 7, 1964

INVENTORS
WILLIAM T. ALDERSON
HANNS HORNSCHUCH
CLYDE E. HOLVENSTOT
BY
David W. Tillhott
ATTORNEY This invention relates generally to apparatus for dehumidifying compressed air and particularly to apparatus for use in conjunction with an air compressor system to deliver dehumidified compressed air.

United States Patent Office 3,226,948
Patented Jan. 4, 1966

3,226,948
DEHUMIDIFYING APPARATUS
William T. Alderson, Brookside, and Clyde E. Holvenstot, Flanders, N.J., and Hanns Hornschuch, Easton, Pa., assignors to Ingersoll-Rand Company, New York, N.Y., a corporation of New Jersey
Filed Oct. 7, 1964, Ser. No. 402,115
2 Claims. (Cl. 62—317)

This invention relates generally to apparatus for dehumidifying compressed air and particularly to apparatus for use in conjunction with an air compressor system to deliver dehumidified compressed air.

Heretofore, it has been the practice to dehumidify compressed air by use of a mechanical refrigeration system. The mechanical refrigeration type of dehumidifying apparatus system requires a considerable amount of expensive heavy machinery including a compressor and prime mover to drive the compressor. In addition, operation of this machinery requires a supply of fuel or energy to drive the prime mover. Finally, the maintenance costs of this type of system are relatively expensive. These requirements make it expensive to install, operate, and maintain the mechanical refrigeration type of compressed air dehumidifying apparatus.

In fact, this expense is so great that many owners of compressed air systems continue to put up with the disadvantages of using "wet" compressed air in lieu of the use of dehumidifying systems of the mechanical refrigeration type.

The principal object of this invention is to substantially reduce the expense and other disadvantages of dehumidifying compressed air and to provide an apparatus for economically dehumidifying and delivering compressed air.

Other important objects of this invention are: to provide a compressed air dehumidifying apparatus which does not use a drive motor or other prime mover operated by an additional source of energy; to provide a compressed air dehumidifying apparatus which does not utilize a source of energy or fuel for operating it: and to provide a compressed air dehumidifying apparatus which is much more economical to install, operate, and maintain than previous compressed air dehumidifying apparatus.

Figure 1:
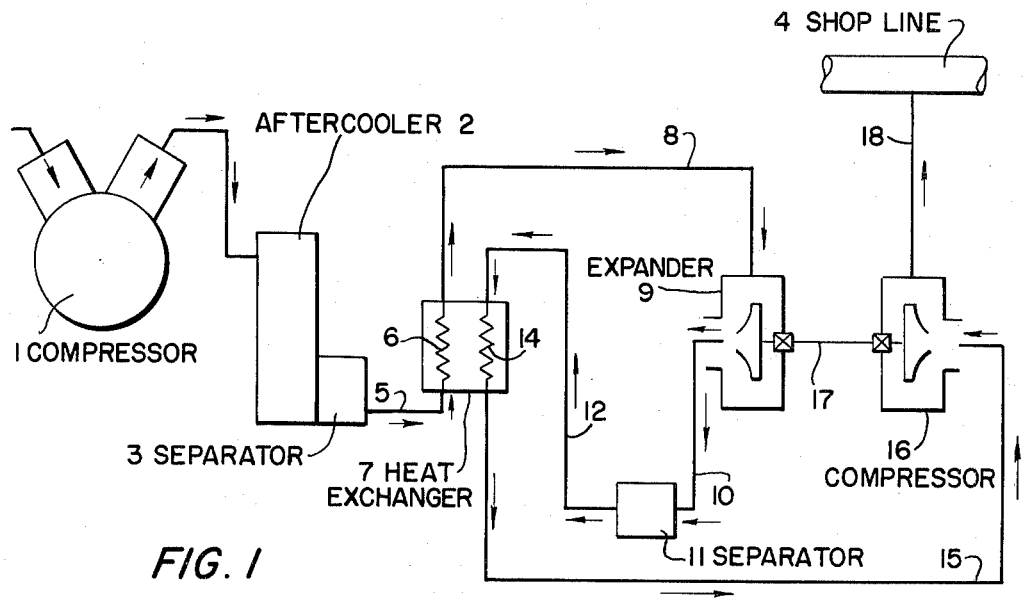
Figure 2:
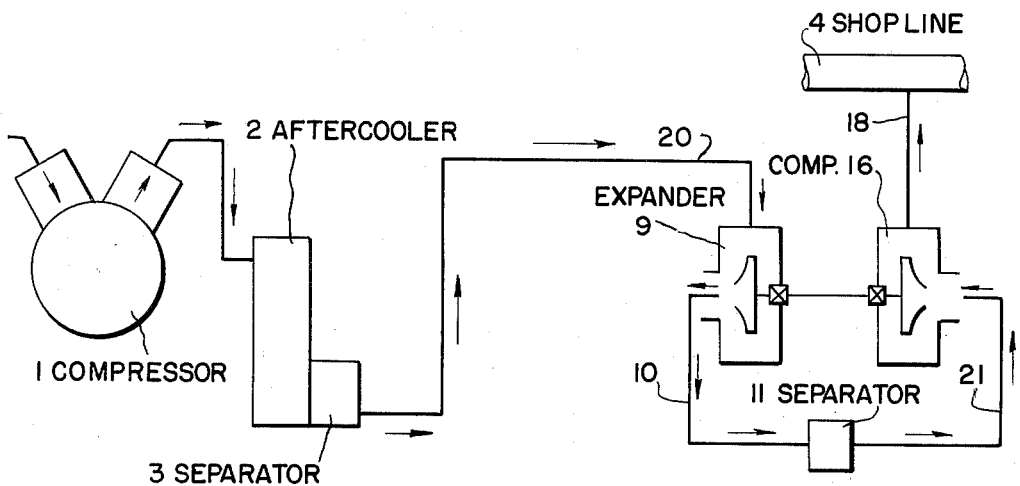

The invention is described in connection with the accompanying drawing wherein:

FIG. 1 is a schematic diagram of an embodiment of the invention connected to a compressed air system; and FIG. 2 is a similar type of diagram showing a second embodiment wherein a heat exchanger is omitted.

The compressed air system shown in FIG. 1 includes a conventional compressor 1 delivering compressed air to an after-cooler 2 and a moisture separator 3. A portion of a conventional compressed air shop line 4 is illustrated for eventually receiving the compressed air discharged from the moisture separator 3. All of this structure is conventional.

This invention involves an apparatus which receives the compressed air from the moisture separator 3, dehumidifies this compressed air and delivers it to the shop line 4.

The moisture separator 3 delivers compressed air by means of a line 5 to a passage 6 in a heat exchanger 7, shown in FIG. 1. The heat exchanger 7 is designed for transmitting heat between two separate flows of compressed air under differential pressures without allowing either flow of compressed air to intermingle or otherwise contact the other.

The compressed air in the passage 6 leaves the heat exchanger 7 via a line 8 and flows into the inlet of a conventional compressed air rotary motor or expander 9. As the compressed air flows through the motor 9, it drives the motor and expands to a lower pressure and lower temperature. Although the compressed air expands substantially in passing through the motor 9, it still remains in a compressed air condition, under a lower pressure but well above atmospheric pressure.

As is well known, the temperature drop of the compressed air passing through the motor 9 reduces the capacity of the air to retain water vapor. If this air contains sufficient water vapor, the drop in temperature will cause some water vapor to condense into water droplets. In other words, any water vapor above what the air can retain at the reduced temperature will condense into water.

The compressed air leaves the motor 9 through a line 10 which delivers it to a conventional moisture separator 11. The separator 11 traps and removes condensed moisture from the stream of compressed air as it flows through the separator 11.

The separator 11 delivers the stream of compressed air to a line 12 running to the passage 14 in the heat exchanger 7. Since the compressed air stream in the passage 14 is under a lower temperature, it extracts heat from and cools the compressed air flowing in the other passage 6 in the heat exchanger 7. Thus, the heat exchanger 7 serves to cool the compressed air a substantial amount before such compressed air is expanded by passing through the motor 9. As a result, the use of the heat exchanger 7 provides a greater overall reduction in temperature of the compressed air than would occur without the heat exchanger.

The flow of compressed air in the heat exchanger passage 14 leaves the heat exchanger 7 by means of an air line 15 and flows to the inlet of a rotary air compressor 16 which compresses the air to a higher pressure. The compressor 16 is conventional and is driven by the air motor 9 through a common shaft 17. Thus, the compressor 16 provides a load for the expander or motor 9 while utilizing most of the energy lost in the motor 9 by the compressed air stream to compress the compressed air stream to a higher pressure. As the air flow is compressed in the compressor 16, it also increases its temperature. The compressor 16 delivers the compressed air to a line 18 running to the shop line 4.

The foregoing apparatus dehumidifies the flow of compressed air passing through it and delivers it to the shop line 4.

A table is presented below of example operating temperatures and pressures which might occur in the foregoing system. The temperatures are measured in degrees Fahrenheit and the pressures are measured in p.s.i. absolute.

| Air line | Temp., ° F. | Pressure, p.s.i.a. |
| --- | --- | --- |
| Line 5 | 80 | 123.0 |
| Line 8 | 64 | 122.7 |
| Line 10 | 50 | 108.0 |
| Line 12 | 50 | 107.7 |
| Line 15 | 70 | 107.4 |
| Line 18 | 85 | 114.7 |
| Shop line 4 | 85 | 114.7 |

The second embodiment shown in FIG. 2 omits the heat exchanger 7. The moisture separator 3 delivers compressed air to an air line 20 running to the inlet of the air motor 9. The moisture separator 11 delivers compressed air to an air line 21 which feeds it to the inlet of the compressor 16. Otherwise, this second embodiment is the same as the first embodiment shown in FIG. 1. Due to the omission of the heat exchanger 7, the second embodiment is not as efficient in dehumidifying the compressed air.

Although this application describes two embodiments, it should be recognized that the invention is not limited merely to these embodiments, but contemplates other embodiments and variations which utilize the concepts and teachings of the invention.

Having described our invention, we claim:

1. A compressed air system comprising:
    (a) a source of compressed air;
    (b) a conduit for containing and storing compressed air therein;
    (c) a rotary compressed air motor and expander connected to receive compressed air from said source and to be driven by said compressed air;
    (d) a rotary compressor connected to said conduit for compressing and delivering compressed air to said conduit;
    (e) a common shaft interconnecting said rotary motor and compressor and arranged so that the compressor loads the motor and the motor drives the compressor;
    (f) a moisture separator connected between said motor and compressor to receive the compressed air exhausted from said motor to remove moisture from this compressed air, and to deliver it to said compressor;
    (g) a heat exchanger connected between said source and said motor; and
    (h) said heat exchanger being further connected between said moisture separator and said compressor and arranged so that the compressed air leaving the moisture separator cools the compressed air flowing from said source to said motor.

2. The system of claim 1 wherein:
    (a) said compressor is driven entirely by said motor without other power means driving said compressor.

References Cited by the Examiner

UNITED STATES PATENTS

| | | | |
|---|---|---|---|
| 2,077,315 | 4/1937 | Ewing | 62—88 |
| 2,175,162 | 10/1939 | Waterfill | 62—402 |
| 2,477,931 | 8/1949 | King | 62—402 |
| 2,835,340 | 5/1958 | McGuff | 62—93 |
| 3,002,362 | 10/1961 | Morrison | 62—87 |
| 3,153,916 | 10/1964 | Schuhmacher | 62—402 |

WILLIAM J. WYE, *Primary Examiner.*